3,053,777
NEW POLYMERIC MATERIALS OF DIBORONIC ACID AND DERIVATIVES

Heinrich Rudolf Goldschmid, Saskatoon, Saskatchewan, Canada, assignor to Imperial Chemical Industries Limited, London, England, a corporation of Great Britain
No Drawing. Filed Jan. 19, 1960, Ser. No. 3,252
Claims priority, application Great Britain Jan. 19, 1959
8 Claims. (Cl. 260—2)

This invention relates to new polymeric materials and more particularly to such materials containing boron.

It is known that phenyl boronic acid can be reacted with dialkylolamines to form chelated esters and that these esters are so stable to hydrolysis that they can be re-crystallised from boiling water. It has now been found that use can be made of this property to obtain new polymeric materials.

According to the present invention a process for the production of new polymeric materials comprises a reacting a diboronic acid or ester or anhydride thereof with a tetrakis-β-hydroxyalkylated polymethylene diamine.

Any diboronic acid, ester or anhydride thereof may be used in the process of my invention. Suitable materials include the polymethylene diboronic acids described in the copending U.S. application Serial No. 3,253 and the phenylene diboronic acids, for example, tetramethylenediboronic acid, pentamethylenediboronic acid, decamethylenediboronic acid and p-phenylenediboronic acid, their tetramethyl and tetrabutyl esters, their anhydrides and the like. Tetramethylenediboronic acid, p-phenylenediboronic acid and their esters and anhydrides are, in general, preferred.

Any tetrakis-β-hydroxylalkylated polymethylene diamine may be used in the process of our invention. It is, however, in general, preferred to use those obtained by reacting ethylene oxide or propylene oxide with a diamine such as ethylene diamine or hexamethylenediamine. Suitable materials include, for example, tetrakis-[2 - hydroxyethyl]ethylenediamine, tetrakis - [2-hydroxyethyl]hexamethylenediamine, tetrakis - [2 - hydroxypropyl]ethylenediamine and the like. Those derived from propylene oxide show, in general less solubility in water and greater resistance to hydrolysis.

The polymeric materials of the present invention may be produced in various ranges of molecular weights and range from materials which are water soluble and fusible, for example, of melting point 300° C. to materials which are water insoluble and infusible. The properties of the polymer obtained in any specific reaction will, of course, depend on the extent to which condensation has taken place and, to some extent, on the reactants employed.

The polymers of my invention are suitable for a variety of purposes, for example, as surface coatings and for production of fibres and the like.

My invention is further illustrated by the following examples in which all parts are by weight.

Example 1

14.6 parts of tetrakis-[2-hydroxyethyl]hexamethylenediamine and 7.3 parts of tetramethylenediboronic acid were heated with 88 parts of dry benzene under reflux until 3.4 parts of water had distilled off. The benzene was then removed by distillation. A white powder was obtained which was dried for two hours at 100° C. under pressure of 10 mm. of mercury to give 18.5 parts of product. This product was soluble in water but insoluble in organic solvents and of melting point 230 to 250° C. The polymer exhibited fibre-forming properties.

Example 2

14.6 parts of tetrakis-[2-hydroxyethyl]hexamethylenediamine and 7.3 parts of tetramethylenediboronic acid were dissolved in 40 parts of ethanol, and the mixture heated until the ethanol and liberated water had distilled off. The residue was dried at 100° C. under a pressure of 10 mm. of mercury for two hours and gave 18.5 parts of a white powder of properties similar to those of the product of Example 1.

Example 3

14.6 parts of tetrakis-[2-hydroxyethyl]hexamethylenediamine and 18.5 parts of tetra-n-butyl tetramethylene diboronate. As the reactants were being mixed a white powder started to separate. The mixture was heated to distil off the n-butanol and the product remaining treated as in the previous examples. 18.6 parts of a product similar to that of Example 1 were obtained.

Example 4

14.6 parts of tetrakis-[2-hydroxyethyl]hexamethylenediamine and 8.3 parts of para-phenylenediboronic acid were mixed with 88 parts of dry benzene and the mixture heated under reflux until 3.5 parts of water had distilled off. The benzene was then distilled off and the product which was a white powder, was washed with ethanol and dried for two hours at 100° C. under a pressure of 10 mm. of mercury. 19.4 parts of polymer were obtained. This polymer was insoluble in water and most organic solvents, but was soluble in dibutyl phthalate, and was stable at temperatures below 380° C. A sample boiled in water for 4 hours was recovered unchanged.

Example 5

14.6 parts of tetrakis-[2-hydroxyethyl]hexamethylenediamine and 19.5 parts of tetra-n-butyl-para-phenylene diboronate were mixed together. During mixing the product started to separate. The mixture was then heated to distil off the n-butanol evolved, and the product washed with ethanol and dried at 100° C. under a pressure of 10 mm. of mercury for 2 hours. 19.5 parts of a product similar to that of Example 4 were obtained.

Example 6

14.6 parts of tetrakis-[2-hydroxypropyl]ethylenediamine and 7.3 parts of tetramethylenediboronic acid were mixed together and added to 88 parts of dry benzene. The mixture was heated under reflux until 3.5 parts of water had distilled off, after which the benzene was removed by distillation and the residue washed with ethanol. The product obtained was dried at 100° C. under a pressure of 10 mm. of mercury for two hours to give 18.4 parts of a white powder soluble in water but insoluble in common organic solvents. This polymer was of melting point 300 to 320° C. and was stable at temperatures below 380° C.

Example 7

14.6 parts of tetrakis-[2-hydroxypropyl]ethylenediamine and 18.5 parts of tetra-n-butyltetramethylenediboronate were mixed together. During mixing a white product started to separate. The liberated butanol was removed by distillation and the product washed with ethanol and dried at 100° C. under a pressure of 10 mm. of mercury for 2 hours. 18.4 parts of product were obtained. This product was similar to that of Example 6.

Example 8

14.6 parts of tetrakis-[2-hydroxypropyl]ethlyenediamine and 8.3 parts of para-phenylenediboronic acid were mixed together and added to 88 parts of dry benzene. The mixture was heated under reflux until 3.6 parts of water had distilled off after which the benzene was removed by distillation. The product was washed with ethanol and dried at 100° C. under pressure of 10 mm. of mercury for two hours to give 19.3 parts of a white powder. This polymer was insoluble in water and organic solvents and stable at temperatures below 320° C.

*Example 9*

14.6 parts of tetrakis-[2-hydroxypropyl]ethylenediamine and 19.5 parts of tetra-n-butyl para-phenylene diboronate were mixed together. During the mixing the product started to separate. The butanol evolved was distilled off and the residue washed with ethanol and dried at 100° C. under a pressure of 10 mm. of mercury for two hours. 19.4 parts of a polymer similar to the product of Example 8 was obtained.

What I claim is:

1. A process for the production of new polymeric materials comprising reacting a boron substance selected from the group consisting of phenylene diboronic acids, polymethylene diboronic acids having not more than 12 methylene groups in the polymethylene chain and lower alkyl esters thereof, and a diamine selected from the group consisting of tetrakis-(2-hydroxy ethyl)- and tetrakis-(2-hydroxy ethyl propyl)-polymethylene diamines in which the polymethylene group has from 2 to 6 methylene groups inclusive.

2. A process as claimed in claim 1 wherein said boron substance is tetramethylene diboronic acid.
3. A process as claimed in claim 1 wherein said boron substance is paraphenylene diboronic acid.
4. A process as claimed in claim 1 wherein said boron substance is tetra-n-butyl tetramethylene diboronate.
5. A process as claimed in claim 1 wherein said boron substance is tetra-n-butyl paraphenylene diboronate.
6. A process as claimed in claim 1 wherein said diamine is tetrakis-(2-hydroxy ethyl)-ethylene diamine.
7. A process as claimed in claim 1 wherein said diamine is tetrakis-(2-hydroxy ethyl)-hexamethylene diamine.
8. A process as claimed in claim 1 wherein said diamine is tetrakis-(2-hydroxy propyl)ethylene diamine.

References Cited in the file of this patent

UNITED STATES PATENTS

| | | |
|---|---|---|
| 2,352,796 | McLeod | July 4, 1944 |
| 2,408,332 | Morgan | Sept. 24, 1946 |
| 2,939,877 | Washburn | June 7, 1960 |

OTHER REFERENCES

Nielsen et al.: Journal American Chemical Society, vol 79, pages 3091–4 (1957).

Letsinger et al.: Journal American Chemical Society, vol. 80, pages 5411–3 (1958).